United States Patent [19]

LeGrow

[11] Patent Number: 5,690,860
[45] Date of Patent: Nov. 25, 1997

[54] PARTICULATE INORGANIC OXIDE TREATED WITH CYCLIC POLYSILOXANE

[75] Inventor: Gary Edward LeGrow, Midland, Mich.

[73] Assignee: Dow Corning Corporation, Midland, Mich.

[21] Appl. No.: 566,627

[22] Filed: Dec. 4, 1995

[51] Int. Cl.$^6$ .................. B01J 13/00; C09C 1/36
[52] U.S. Cl. .................. 252/309; 106/446; 106/490; 252/314; 252/315.2; 252/363.5; 428/405
[58] Field of Search .................. 252/308, 309, 252/314, 315.2, 363.5; 428/405; 106/490, 446

[56] References Cited

U.S. PATENT DOCUMENTS

| | | | |
|---|---|---|---|
| 4,578,266 | 3/1986 | Tietjen et al. | 424/63 |
| 4,831,169 | 5/1989 | Grape et al. | 556/451 |
| 4,950,502 | 8/1990 | Saam et al. | 252/309 X |
| 5,066,485 | 11/1991 | Brieva et al. | 424/63 |
| 5,074,912 | 12/1991 | Liles et al. | 106/2 |
| 5,175,325 | 12/1992 | Brown et al. | 556/9 |
| 5,330,836 | 7/1994 | Buese et al. | 428/405 |
| 5,372,905 | 12/1994 | Deusser et al. | 428/405 X |

FOREIGN PATENT DOCUMENTS

| | | |
|---|---|---|
| 224978 | 6/1987 | European Pat. Off. |
| 61-268763 | 11/1986 | Japan . |
| 63-63751 | 3/1988 | Japan . |
| 86027329 | 3/1988 | Japan . |
| 5287214 | 11/1993 | Japan . |
| 6032991 | 2/1994 | Japan . |

*Primary Examiner*—Richard D. Lovering
*Attorney, Agent, or Firm*—Alexander Weitz

[57] ABSTRACT

The invention relates to a particulate silica or particulate titania which is treated with a cyclic polysiloxane having the formula

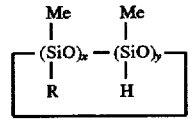

in which Me represents a methyl radical and R is an alkyl group having 2 to 12 carbon atoms. The treated particles can be uniformly dispersed in a non-polar organic medium to provide a system having greater stability than similar prior art dispersions.

20 Claims, No Drawings

PARTICULATE INORGANIC OXIDE TREATED WITH CYCLIC POLYSILOXANE

FIELD OF THE INVENTION

The present invention relates to a particulate inorganic oxide which has its surface modified by a cyclic polysiloxane. More particularly, the invention relates to particulate silicon dioxide or titanium dioxide which is treated with a cyclic polysiloxane containing both silicon hydride as well as alkyl groups in its molecule.

BACKGROUND OF THE INVENTION

Many industrial and consumer-directed compositions such as paints, inks and cosmetics, inter alia, require the dispersion of a particulate inorganic filler or pigment in a relatively non-polar organic matrix. However, both the preparation of such a dispersion, and the ultimate stability thereof, are often problematic from at least two different perspectives. First, there is generally a significant difference between the density of the inorganic material and that of the organic matrix and the particles have a tendency to settle out upon prolonged storage, particularly when the viscosity of, the organic matrix is low and/or the particles are large (e.g., larger than about 1 micrometer). Second, the inorganic fillers are generally hydrophilic and therefore also tend to agglomerate in the oleophilic organic environment irrespective of the above mentioned gravitational effect. Thus, both of these effects contribute to the concentration of the inorganic particles at the bottom of containers, often accompanied by the formation of clumps which are difficult to redisperse properly when the composition is finally used for its intended purpose.

The above described dispersion and stability problems can be overcome to some extent by treating the inorganic particles with various organic or silicone agent before dispersing them in the organic medium. Such treatment, which generally comprises coating of the agent on the surface of the particles, is believed to reduce the hydrophilic character thereof. Thus, for example, U.S. Pat. No. 4,831,169 to Grape et al. discloses linear diorganopolysiloxanes which comprise both SiH-containing siloxane units as well as siloxane units which have a $C_6$–$C_{18}$ alkyl group attached to silicon. While this patent does not explicitly illustrate the use of the diorganopolysiloxane as a treating agent for inorganic particles, it does suggest this utility in general terms for modifying pigments in order to impart compatibility with organic material.

SUMMARY OF THE INVENTION

It has now been discovered that the stability of particulate $SiO_2$ or $TiO_2$ dispersed in non-polar organic media are significantly improved when the surface of the particles is modified with a cyclic polysiloxane of the invention. When the above mentioned particle types are treated with the instant cyclic polysiloxane, they are readily dispersed in non-polar organic media and the resulting dispersions are considerably more stable and resistant to phase separation than those prepared from particles treated with the linear diorganopolysiloxanes taught by Grape et al., cited supra. Surprisingly, treatment of other inorganic particles, such as talc, with the instant cyclic polysiloxanes did not improve the stability of the corresponding dispersion in a non-polar organic medium.

The present invention, therefore, relates to a treated particulate inorganic oxide comprising (A) a particulate inorganic oxide selected from the group consisting of silica, titania and mixtures thereof, said inorganic oxide being treated with (B) a cyclic polysiloxane having the formula

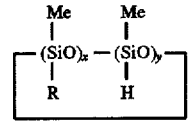

in which Me represents a methyl radical, R is an alkyl group having 2 to 12 carbon atoms, x has an average value of 1 to 5, y has an average value of 1 to 5 and (x+y) has an average value of 4 to 6, wherein from 0.1 to 5 parts by weight of said cyclic polysiloxane (B) is used for each 100 parts by weight of said inorganic oxide (A).

The invention further relates to the above treated particulate inorganic oxide which is uniformly dispersed in a non-polar organic medium.

The invention also relates to a method for preparing a dispersion of a particulate silica or titania in a non-polar organic medium comprising (i) treating the particulate with the above described cyclic polysiloxane and (ii) uniformly dispersing the treated particulate in the organic medium.

DETAILED DESCRIPTION OF THE INVENTION

The particulate inorganic oxide (A) can be a fine powder consisting essentially of various forms of silica ($SiO_2$) or titania ($TiO_2$), or mixtures thereof. For the purpose of the present invention, the term "particulate" is used to indicate that component (A) comprises a plurality of small particles which can have a regular (e.g., essentially spherical, crystalline) or irregular shape.

In one embodiment of the instant invention, component (A) is a particulate silica, such as precipitated silica, fumed silica, ground quartz, ground glass, silica microspheres, glass fiber or diatomaceous silica. There is no specific limitation on the average particle size of the silica, but the typical average diameter (or average largest overall dimension) of the particles in preferably in the approximate range 0.001 to 10 micrometers, more preferably 0.01 to 1 micrometer. Those skilled in the art will appreciate that particulate silicas having a high surface hydroxyl group content will benefit most from the treatment of the instant invention since these particles are highly hydrophilic and therefore most difficult to disperse in a non-polar organic medium. Thus, the instant method, described infra, finds particular utility in the treatment of precipitated silica.

In a second embodiment of the invention, the particulate inorganic oxide is titania (i.e., titanium dioxide or $TiO_2$). Again, there is no specific limitation on the average particle size of the titania, typical average diameter (or average largest overall dimension) being in the approximate range 0.001 to 10 micrometers preferably 0.01 to 1 micrometer.

In the method of the present invention, at least one of the above particulate inorganic oxides is treated with (B) a cyclic polysiloxane having the formula

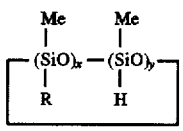

in which Me hereinafter represents a methyl radical and R is a linear or branched alkyl group having 2 to 12 carbon atoms, preferably 6 to 12 carbon atoms. Examples of suitable R groups include such radicals as ethyl, propyl, isobutyl, hexyl, ethylhexyl, octyl, decyl and dodecyl. In the above formula, x has an average value of 1 to 5 and y has an average value of 1 to 5 with the proviso that (x+y) has an average value of 4 to 6. Preferably, x is 2 to 4 and the value of y is adjusted so as to comply with the above proviso.

The above described cyclic polysiloxane may be prepared by methods known in the art. Briefly, this preparation can be carried out by a platinum-catalyzed hydrosilation reaction between a cyclic methylhydrogenpolysiloxane and a 1-alkene having 2 to 12 carbon atoms, the hydrosilation being carried out in a moisture-free environment. This reaction may be illustrated (for the case wherein R is a hexyl radical) by the equation

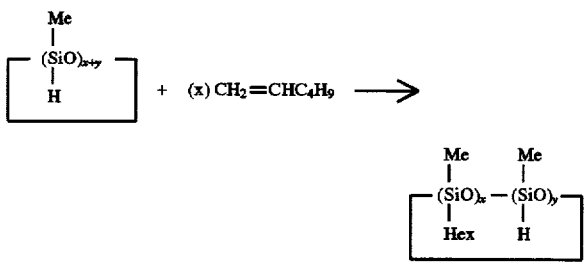

wherein x and y are as defined above and Hex denotes a hexyl radical. Of course, the resulting cyclic polysiloxane is a mixture of species wherein some, all and none of the SiH sites on the cyclic methylhydrogenpolysiloxane are reacted, the distribution of these products being dictated by statistical and steric considerations. However, the predominant product will be determined by the molar ratio of the cyclic methylhydrogenpolysiloxane to the 1-alkene (e.g., x moles of alkyl radicals per mole of product in the above equation). The above reaction is generally carried out by heating the 1-alkene and the cyclic methylhydrogenpolysiloxane in the presence of a platinum catalyst wherein the platinum is in a neutral valence state. Examples of suitable catalysts include platinum on carbon, chloroplatinic acid-vinylsiloxane platinum complex, as disclosed in U.S. Pat. No. 3,419,593 to Willing, and a neutralized complex of platinous chloride and divinyltetramethyldisiloxane, as disclosed in U.S. Pat. No. 5,175,325 to Brown et al., both of these patents being hereby incorporated by reference. The amount of catalyst used in the above hydrosilation reaction is generally sufficient to provide about 0.1 to about 1,000 parts by weight, preferably 1 to 500 parts and most preferably 10 to 300 parts, for each one million parts by weight of the reactants. Typically, the reaction is run at a temperature of 25° to 80° C., preferably at 50° to 70° C.

To prepare a treated particulate inorganic oxide of the invention, 100 parts by weight of the particulate inorganic oxide (A) is treated with about 0.1 to 5 parts by weight, preferably about 0.5 to about 2 parts and most preferably about 1 part, of the cyclic polysiloxane (B). For the purposes of the present invention, the terms "treated" or "treating" are used to indicate that the cyclic polysiloxane (B) is used to coat at least a portion of the surface of the inorganic oxide particles. When less than about 0.1 part by weight of component (B) is used to treat each 100 parts by weight of component (A), there is generally insufficient coverage of the particulate surface and no improvement in the dispersion process or stability of the dispersion is obtained. When more than about 5 parts by weight of component (B) is used for each 100 parts by weight of component (A), essentially all of the particulate surface is covered and residual cyclic polysiloxane (B) is left in the composition. Not only is the presence of excess cyclic polysiloxane wasteful, but such a composition contains active SiH groups which can generate hydrogen upon exposure to moisture and lead to undesired gassing. As noted above, the amount of component (B) needed is generally directly proportional to the hydroxyl content of the silica or titania being treated. An optimum treatment level for a given combination of particulate inorganic oxide (A) and cyclic polysiloxane (B) can easily be determined by routine experimentation.

The treating process preferably comprises tumbling or shaking components (A) and (B) together under ordinary ambient conditions (e.g., 25° C.). Moisture should be excluded during this mixing procedure and the inorganic oxide should be dried to remove free water. Preferably, component (B) is added to component (A) in such a mixing operation. Alternatively, the treatment can be accomplished by exposing the inorganic oxide to the vapors of the cyclic polysiloxane. In the latter technique, components (A) and (B) are merely heated together at reduced pressure.

The above described treated particulate inorganic oxide can be uniformly dispersed in (C) a non-polar organic (i.e., non-silicone) oil, plastic, resin or elastomer. Examples of non-polar organic media include such compounds as hydrocarbons, simple esters, ethers, fluorocarbons and halofluorocarbons. Preferably, the organic medium is selected from synthetic hydrocarbon oils or vegetable oils.

Examples of media having a relatively low viscosity include various natural and synthetic oils, such as mineral oil, fluorocarbon oils, various non-polar organic solvents, oligomers of poly(alpha-olefins), nitrocellulose, and the like. Examples of suitable polymeric organic media include polypropylene, polyethylene, polystyrene, butyl rubber, polyisobutylene, and copolymers of such systems.

The amount of treated particulate silica or titania which is dispersed in the non-polar organic medium can vary greatly according to the particular application and is best determined by routine experimentation. Typical amounts employed are in the range 0.1 to 80 parts by weight of the treated particulate oxide for each 100 parts by weight of the organic medium.

A dispersion of the treated particulate silica or titania in the non-polar organic medium (C) can be prepared by uniformly mixing the treated particulate inorganic oxide with the organic medium. This mixing can be accomplished by simply stirring, shaking or tumbling these components at ordinary ambient (e.g., 25° C.) conditions if the viscosity of the organic medium is low enough. Alternatively, particularly when the organic medium is a solid at room temperature or has a high viscosity, heat may be applied and the mixing operation can be practiced according to well known techniques for dispersing fillers and pigments in plastic or elastomeric materials. This can be done in a variety of commercially available equipment such as sigma blade mixers, twin-screw extruders and Banbury mixers.

Dispersions of the invention wherein the organic medium has a relatively low viscosity find utility as base fluids in the paint, ink and cosmetic industries. In such formulations the treated particulate inorganic oxide generally serves as a thickening agent.

In the case of the polymeric organic media, the instant dispersions may be used as is or they may be further formulated with additional ingredients such as plasticizers, fillers, pigments, stabilizers, antioxidants, cure agents, inter alia. Such compositions can be molded, extruded or otherwise fabricated into plastic or rubber parts for general industrial or consumer use.

EXAMPLES

The following examples are presented to further illustrate the composition and method of this invention, but are not to be construed as limiting the invention, which is delineated in the appended claims. All parts and percentages in the examples are on a weight basis and all measurements were obtained at about 25° C., unless indicated to the contrary.

Example 1

To a stirred sample of 180 g of the methylhydrogencyclotetrasiloxane $(HMeSiO)_4$ (3.0 equivalents of SiH) there was added a mixture of 126 g of hexene-1 (1.5 moles) and 45 microliters of a neutralized complex of platinous chloride and divinyltetramethyldisiloxane, the latter being described in U.S. Pat. No. 5,175,325 to Brown et al. An exotherm was observed immediately upon addition. Analysis by gas chromatography (GC) of the crude product showed the absence of hexene-1 and $(HMeSiO)_4$ while additional peaks of the hydrosilation products formed (i.e., a cyclic polysiloxane of the invention). GC/MS (mass spectroscopy) analysis of the crude product confirmed the presence of at least two of the expected species of the hydrosilation reaction:

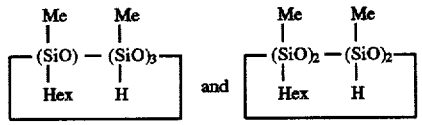

wherein Hex represents n-hexyl radical.

Example 2

Three inorganic fillers were obtained:
(1) $TiO_2$ (Degussa™ P25 marketed by Degussa Corp., Ridgefield Park, N.J.).
(2) $SiO_2$ (Cab-O-Sil™ M7D marketed by Cabot Corporation, Tuscola, Ill.). This is described as a fumed silica having a surface area of 200 $m^2/g$.
(3) Talc having an average particle size of 4 micrometers (Luzenac America, Three Forks, Mont.).

Approximately 10 g of each of the above fillers were placed into glass jars along with 0.1 g of the cyclic polysiloxane product prepared in Example 1 (treatment level of 1 part cyclic polysiloxane per 100 parts of the oxide). The jars were capped and shaken for 72 hours. At this point the oxides were clearly "hydrophobed" as evident from their "free flowing" characteristic in the container.

Dispersions of treated and untreated inorganic particles in an organic medium were prepared. The organic medium used was a mineral oil having a viscosity of about 55 $(mm)^2/s$ (55 cS). In each case, 2 g of the particulate inorganic material, described above, was added to 50 g of the medium (i.e., 4 parts of particulate for each 100 parts of mineral oil). These mixtures were shaken for 1 hour on a mechanical wrist shaker to provide uniform dispersions which were then stored and observed after 24 hours and again after about two months.

$TiO_2$ samples:

After 24 hours, much of the untreated titania settled out of the mineral oil, leaving a clear top layer of the oil (approximately ¼ of sample by volume). The treated sample had a small amount of settling although larger particles (about ½ the amount relative to the untreated samples) did settle out. The top layer of the treated sample was hazy, indicating that titania was still suspended therein. Sensory testing of the hazy layer was conducted by applying it to the back of a subject's hand, followed by a rubbing in. This resulted in a "silky" feel indicative of a silylated filler.

After nearly two months, the untreated titania sample had a clear top layer and an opaque, white (settled) layer, the latter being about 44% of the total dispersion by volume. The treated sample of titania had a corresponding settled layer which represented only about 11% of the total dispersion volume. These observations indicated that the treatment was effective in stabilizing the titania dispersion.

$SiO_2$ samples:

After 24 hours, the untreated silica dispersion in mineral oil was slightly hazy but agglomerated particles were observed. The treated sample was clear, and although it showed some particles not dispersed, these particle were readily redispersed by additional shaking. Sensory testing, as described above, also resulted in the "silky" feel indicative of a silylated filler.

After nearly two months, the untreated silica sample had a slightly hazy top layer and a white (settled) layer, the latter being about 44% of the total dispersion by volume. The treated sample of silica had a clear top layer and a corresponding settled layer which represented only about 28% of the total dispersion volume. These observations indicated that the treatment was effective in stabilizing the silica dispersion.

Talc sample:

After 24 hours, both treated and the untreated talc dispersions had settled to about the same extent, leaving a slightly hazy layer above a brownish layer of precipitated talc. The treated talc sample was more readily redispersed than the untreated sample.

After nearly two months, the untreated talc sample had a slightly hazy top layer and an opaque (settled) layer, the latter being about 17% of the total dispersion by volume. The treated sample of talc had a corresponding settled layer which represented about 11% to the total dispersion volume. These observations indicated that the treatment was not effective in stabilizing the talc dispersion.

Example 3

The use of a cyclic polysiloxane of the present invention as a treatment for silica was compared with the use of a linear polysiloxane, as suggested by Grape et al., cited supra.

A trimethylsiloxy-terminated methylhydrogenpolysiloxane (96 g) having a viscosity of about 44 cP (44 mPa-s) was equilibrated with 4 g of hexamethyldisiloxane using 1 g of DOWEX™ DR 2030 ion exchange resin as acidic equilibration acid catalyst. The equilibration was carried out in a round bottom flask equipped with a stirrer, nitrogen blanket and water condenser. The reactants were stirred and heated to 100° C. and held at that temperature for four hours. The viscosity of the product was 20 mPa-s (20 cP). This was filtered to remove the ion-exchange resin and stripped of excess cyclics. Final analysis by $^{29}Si$ NMR indicated that the linear methylhydrogenpolysiloxane had the average structure

  (I)

Fifty grams of (I) were premixed with $3\times10^{-1}$ moles of Pt catalyst (as chloroplatinic acid) and placed into a 125 ml addition funnel. Forty-three grams of dodecene-1 (Gulftene™ 12; Chevron Chemical Co., Houston, Tex.) was charged to a 250 ml flask. The above described catalyst and siloxane mixture was added dropwise and the temperature climbed to about 70° C. The temperature was maintained at 70° C., and when the addition was complete, the material was stirred and held for ½ hour at 70° C. The resulting material was analyzed by $^{29}$Si NMR which indicated the following average structure

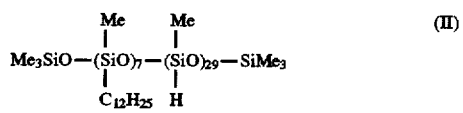

this material having essentially the same structure as the linear polysiloxane shown in Example 1 of the above mentioned patent to Grape et al., cited supra.

A cyclic polysiloxane of the invention was prepared by adding 119.3 grams (0.741 mole) of a mixture of cyclic methylhydrogenpolysiloxanes having 4 and 5 siloxane units to a flask. Dodecene-1 (75 g; 1.11 moles) was premixed with 22.5 microliters of a neutralized complex of platinous chloride and divinyltetramethyldisiloxane, as disclosed in U.S. Pat. No. 5,175,325 to Brown et al., and this mixture was added dropwise to the flask. The temperature was maintained at 70° C., and when the addition was complete, the material was stirred and held for 1 hour at 70° C. The resulting material was analyzed by $^{29}$Si NMR which indicated the following average structure

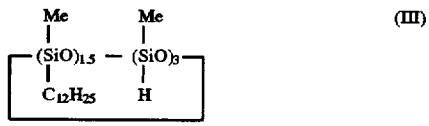

Products (II) and (III) were used to treat a fumed silica having a surface area of 90 m²/g, Cab-O-Sil™ L-90 (Cabot Corp.). Approximately eight grams of the L-90 silica were added to each of three eight ounce jars. No treatment was added to the first jar (control). In the second jar containing 8.18 grams of L-90, 0.08 gram of product (II) was added. In the third jar containing 7.93 grams of L-90, 0.11 gram of product (III) was added. This represents a treatment level of about 1% based on silica for the second and third jars. All three jars were clamped onto an air-driven mixing wheel to treat the fillers, and the samples were inspected after being tumbles for 24 hours.

The treated silica in the second jar (comparative treatment) looked the same as the untreated silica and it formed large, non-uniform balls. The treated silica in the third jar (treatment of the invention) was more finely dispersed, coating the sides of the jar as free flowing powder. The samples were allowed to mix for an additional 32 hours.

The above described treated silicas and untreated control were dispersed in a mineral oil having a viscosity of 29 mPa-s (29 cP). Each of three four ounce jars was filled with approximately 25 grams of the mineral oil. To the first jar containing 24.96 grams of mineral oil, there was added 1.02 grams of the tumbled untreated silica (system A). To the second jar containing 25.07 grams of mineral oil, there was added 1.01 grams of the silica treated with product (II) (system B). To the third jar containing 25.14 grams of mineral oil, there was added 1.03 grams of the silica treated with product (III) (system C). Thus, each of these systems had a silica content of about 4 parts per 100 parts of the mineral oil.

Each of these systems was shaken manually to disperse the silica in the mineral oil. Initially, all three samples were clear. To assure complete dispersion, the three samples were placed on a mechanical wrist shaker for one hour and then allowed to stand for 24 hours. System B and system C were analyzed by FTIR (Fourier Transform Infrared) and both showed no residual SiH functionality.

Initially, all the samples contained uniformly dispersed air bubbles which were introduced during the shaking operation. The viscosity of these systems was greater than that of the mineral oil and each system was clear.

After 8 hours, a clear, bubble-free, upper layer started to form in all three systems. This upper clear layer was largest in system B (about 50% by volume). A similar clear upper layer formed in system C (about 25% by volume) and this system had large air bubbles trapped in the lower layer. System A had the least amount of the clear upper layer and its lower layer was cloudy.

After 24 hours, the upper clear layers did not change. System A now contained a few small bubbles throughout the lower layer. The lower layer of system A appeared hazy and gelatinous.

After 24 hours, the lower layer of system B had even fewer small bubbles than did system A, all of the bubbles being located near the bottom of the jar. The lower layer (about 50% by volume) was slightly hazy and appeared to have a slight increase in viscosity.

After 24 hours, the larger air bubbles were still uniformly dispersed in the lower layer (about 75% by volume) of system C; both of its layers were clear.

It can be concluded that the stability of system C was considerably greater than that of system B based on the following indirect analysis. First, it is noted that the uniform dispersion of treated or untreated particulate silica in the mineral oil resulted in a system having a viscosity considerably greater than that of the oil itself. This effect facilitates the entrapment of air bubbles, the larger bubbles being the more difficult to entrap. Further, the upper, clear layer of each system contained no bubbles and therefore had a relatively low concentration of silica. The observation that small bubbles were trapped near the bottom of the lower layer in system B indicates that the particulate silica was also concentrated near the bottom of this lower layer. Finally, the observation that larger bubbles were uniformly dispersed in the lower layer of system C indicates that this silica, treated according to the method of the invention, was also uniformly dispersed in the lower layer.

That which is claimed is:

1. A coated particulate inorganic oxide comprising:
   (A) a particulate inorganic oxide selected from the group consisting of silica, titania and mixtures thereof, said inorganic oxide being coated with
   (B) a cyclic polysiloxane having the formula

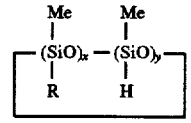

in which Me represents a methyl radical, R is an alkyl group having 2 to 12 carbon atoms, x has an average value of 1 to 5, y has an average value of 1 to 5 and (x+y) has an average value of 4 to 6, wherein from 0.1 to 5 parts by weight of said cyclic polysiloxane (B) is used for each 100 parts by weight of said inorganic oxide (A).

2. The coated particulate inorganic oxide according to claim 1, wherein said particulate inorganic oxide (A) is silica.

3. The coated particulate inorganic oxide according to claim 2, wherein R of said cyclic polysiloxane (B) has 6 to 12 carbon atoms.

4. The coated particulate inorganic oxide according to claim 3, wherein x of said cyclic polysiloxane (B) has an average value of 2 to 4.

5. The coated particulate inorganic oxide according to claim 1, wherein said particulate inorganic oxide (A) is titania.

6. The coated particulate inorganic oxide according to claim 5, wherein R of said cyclic polysiloxane (B) has 6 to 12 carbon atoms.

7. The coated particulate inorganic oxide according to claim 6, wherein x of said cyclic polysiloxane (B) has an average value of 2 to 4.

8. A composition comprising a dispersion of
(I) a coated particulate inorganic oxide comprising
(A) a particulate inorganic oxide selected from the group consisting of silica; titania and mixtures thereof, said inorganic oxide being coated with
(B) a cyclic polysiloxane having the formula

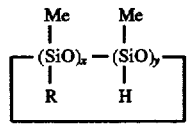

in which Me represents a methyl radical, R is an alkyl group having 2 to 12 carbon atoms, x has an average value of 1 to 5, y has an average value of 1 to 5 and (x+y) has an average value of 4 to 6, wherein from 0.1 to 5 parts by weight of said cyclic polysiloxane (B) is used for each 100 parts by weight of said inorganic oxide (A), in (II) a non-polar organic medium.

9. The composition according to claim 8, wherein said particulate inorganic oxide (A) is silica.

10. The composition according to claim 9, wherein R of said cyclic polysiloxane (B) has 6 to 12 carbon atoms.

11. The composition according to claim 10, wherein x of said cyclic polysiloxane (B) has an average value of 2 to 4.

12. The composition according to claim 8, wherein said particulate inorganic oxide (A) is titania.

13. The composition according to claim 12, wherein R of said cyclic polysiloxane (B) has 6 to 12 carbon atoms.

14. The composition according to claim 13, wherein x of said cyclic polysiloxane (B) has an average value of 2 to 4.

15. The composition according to claim 8, wherein said non-polar organic medium is selected from the group consisting of hydrocarbons, esters, ethers, fluorocarbons and halofluorocarbons.

16. The composition according to claim 15, wherein said non-polar organic medium is selected from the group consisting of synthetic hydrocarbon oils and vegetable oils.

17. A method for preparing a dispersion of a particulate inorganic oxide in a non-polar organic medium comprising (i) coating (A) a particulate inorganic oxide selected from the group consisting of silica, titania and mixtures thereof with (B) a cyclic polysiloxane having the formula

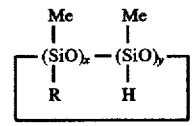

in which Me represents a methyl radical, R is an alkyl group having 2 to 12 carbon atoms, x has an average value of 1 to 5, y has an average value of 1 to 5 and (x+y) has an average value of 4 to 6, wherein from 0.1 to 5 parts by weight of said cyclic polysiloxane (B) is used for each 100 parts by weight of said inorganic oxide (A), to prepare a coated particulate inorganic oxide; and (ii) uniformly dispersing said coated particulate inorganic oxide in a non-polar organic medium.

18. The method according to claim 17, wherein R of said cyclic polysiloxane (B) has 6 to 12 carbon atoms.

19. The method according to claim 18, wherein x of said cyclic polysiloxane (B) has an average value of 2 to 4.

20. The method according to claim 17, wherein said non-polar organic medium is selected from the group consisting of hydrocarbons, simple esters, ethers, fluorocarbons and halofluorocarbons.

\* \* \* \* \*